United States Patent [19]

Schindler et al.

[11] Patent Number: 4,919,860
[45] Date of Patent: Apr. 24, 1990

[54] MANUFACTURE OF POROUS CARBON MEMBRANES

[75] Inventors: Erich Schindler; Franz Maier, both of Obernburg, Fed. Rep. of Germany

[73] Assignee: Akzo NV, Arnhem, Netherlands

[21] Appl. No.: 218,280

[22] Filed: Jul. 13, 1988

[30] Foreign Application Priority Data

Jun. 25, 1986 [DE] Fed. Rep. of Germany ....... 3621257

[51] Int. Cl.$^5$ .................... B29C 67/20; B29C 71/02
[52] U.S. Cl. .................... 264/29.1; 264/29.2; 264/29.6; 264/29.7; 264/41; 264/83; 264/85; 264/102; 264/129; 264/233; 264/288.8; 264/289.3; 264/289.6; 264/340; 427/175; 427/226; 427/227; 210/500.21; 210/500.23; 210/500.43
[58] Field of Search ............ 210/500.21, 500.23, 210/500.42, 500.43, 503, 505, 508; 264/103, 29.1, 29.2, 41, 233, 85, 571, 101, 102, 83, 29.6, 29.7, 129, 288.8, 289.3, 289.6, 340; 423/447.2, 447.4; 427/112, 175, 176, 226, 227

[56] References Cited

U.S. PATENT DOCUMENTS

| | | | |
|---|---|---|---|
| 3,615,024 | 10/1971 | Michaels | 210/490 |
| 3,674,628 | 7/1972 | Fabre | 161/178 |
| 3,769,390 | 10/1973 | Weisbeck et al. | 423/447 |
| 3,977,967 | 8/1976 | Trulson et al. | 210/500 |
| 4,042,359 | 8/1977 | Schnabel et al. | 65/2 |
| 4,073,870 | 2/1978 | Saji et al. | 423/447.6 |
| 4,341,631 | 7/1982 | Hargitay | 210/323.2 |

FOREIGN PATENT DOCUMENTS

| | | |
|---|---|---|
| 1954505 | 9/1970 | Fed. Rep. of Germany . |
| 2462567 | 10/1977 | Fed. Rep. of Germany . |
| 2614391 | 10/1977 | Fed. Rep. of Germany . |
| 5263428 | 11/1975 | Japan . |
| 1329245 | 9/1973 | United Kingdom . |

OTHER PUBLICATIONS

Patent Abstracts of Japan, 60-202703, vol. 10, No. 28, Mar. 1986.
Journal of Polymer Science: Polymer Chemistry Edition, vol. 21, pp. 1223-1226.
Chemical Abstracts No. 103:72505m, vol. 103, Sep. 1985, p. 61.
Derwent Abstract No. 266754/43, 1985.
Patent Abstracts of Japan, No. 52-63428, vol. 1, No. 102, Sep. 1977.
Patent Abstracts of Japan, No. 60-179102, vol. 10, No. 28, Feb. 1986.
Derwent Abstract No. 293555/47, 1985.
Chemical Abstracts 126259c, vol. 82, 1975.
Chemical Abstracts 85:125211f, vol. 85, 1976.
Chemical Abstracts 99:160512r, vol. 99, 1983.
Chemical Abstracts 99:124603n, vol. 99, 1983.
Chemical Abstracts 104:36181q, vol. 104, 1986.
Chemical Abstracts 104:5251k, vol. 104, 1986.
Koresh et al., "Separation Science and Technology" (1983), 18 (8), pp. 723-734.

*Primary Examiner*—Hubert C. Lorin
*Attorney, Agent, or Firm*—Oliff & Berridge

[57] ABSTRACT

The invention relates to a process for making porous carbon membranes and membranes which can made by this process. As starting material, a porous membrane from an acrylonitril-polymer is used. The starting material is pretreated with a hydrazine solution, followed by preoxidation and carbonization. The process enables carbon membranes to be made with selectively adjusted pore sizes and tight pore size distribution. The pore sizes can lie in the ultrafiltration or microfiltration range. The membranes are suitable for separation processes, in which chemically aggressive media are used and for high-temperature processes. They can be used wherever electrical conductivity of the membranes is required.

11 Claims, No Drawings

MANUFACTURE OF POROUS CARBON MEMBRANES

This is a division of application Ser. No. 07/066,016 filed June 24, 1987, now abandoned.

TECHNICAL FIELD

The invention relates to a process for making porous membranes in the form of capillary, tubular or flat membranes and comprising more than 75 weight percent of carbon. The process comprises a first heat treatment and subsequent carbonization of a porous membrane from an acrylonitrile polymer, the first heat treatment being carried out in the temperature range of 180° to 350° C. and the carbonization in the temperature range of 600° to 3000° C. The invention is also concerned with membranes which can be made by this process.

BACKGROUND OF THE INVENTION

Nowadays, the fields of technology and medicine can no longer be imagined without membranes. Frequently, separation processes can be carried out more advantageously by using membranes instead of other techniques.

Membranes of the most diverse materials and processes for their manufacture are known. Regenerated cellulose, polyamides, and polyolefins are among the materials from which membranes have been made. No matter how excellent membranes of these polymers may be for particular applications, for example, for dialysis of the blood of kidney patients, in many applications they have disadvantages that limit, or even rule out, their use. Such disadvantages of membranes from the aforementioned polymers may include lack of resistance to certain organic solvents or aggressive media such as, for example, strong acids or bases, as well as instability at high temperatures.

Because of the disadvantages of membranes made of organic polymers, membranes from inorganic materials have already been made and used. For example, silica membranes are known from West German Laid-open application (DE-OS) 2,462,567. Porous membranes of alumina are also known. While these inorganic membranes have advantages over membranes from organic polymers, they are also burdened with shortcomings such as brittleness, expensive and elaborate conductivity processes, and inadequate electrical conductivity. For many types of application, the electrically conductivity in particular has in recent times proved to be a property worth striving for.

Carbon presents itself as a material for membranes which do not have the drawbacks of other inorganic membranes. Therefore, membranes have already been made of carbon. J. E. Koresh and A. Sofer, in "Separation Science and Technology" (1983) 18 (8), pages 723 to 734, describe carbon membranes which are made by pyrolysis of organic compounds. Pyrolysis, even during application of relatively low temperatures of, for example, 950° C., results in a carbon material which has no permeability for gases, i.e., lacks a pore system that permits mass transport from one surface of the membrane to another. Rather, such a pore system must be created by a secondary treatment. It has been found that carbon membranes with relatively large pores cannot be made by a process such as indicated in this publication, namely preoxidation and carbonization of a suitable starting material. For example, if an attempt is made to make in this way, from a polyacrylonitrile with relatively large pores going through from one surface to another, carbon membranes with relatively large through-going pores, it is found after preoxidation and carbonization that the pores have become largely closed as a result of tar formation and insufficient stability of the membrane.

The problem of inadequate stability of porous shaped polymer bodies during thermal conversion to carbon bodies is addressed in Japanese Laid-open Application 52-63428. This publication relates to the fabrication of porous filaments serving as adsorption material and having pore sizes up to a few hundred Angstroms. Pretreatment with hydroxylamine is regarded as advantageous to avoid clogged pores. Moreover, hydrazine and guanidine are mentioned as less suitable options. The hydroxylamine solutions which are described for this pretreatment may contain up to 25% of hydroxylamine. The attempt to apply the teaching of this publication to the fabrication of carbon membranes with through-going pores, particularly those with pore sizes up to a few microns, have yielded unsatisfactory results, in conformity with the information in this publication, according to which large specific surfaces were obtained only by steam treatment.

U.S. Pat. Nos. 3,977,967 and 4,341,631 disclose porous tubular bodies of carbon. These shaped items are made by a process in which a binder is carbonized. Further details on the manufacturing process are not given therein. The manufacture of carbon membranes by carbonization of a binder contained in a carrier material has the disadvantage that it is difficult selectively to control pore sizes and/or their distribution. In addition, since the membrane material is morphologically and chemically inhomogeneous, e.g., due to unremoved decomposition products of the binder, the possible uses of the membranes can be limited.

SUMMARY OF THE INVENTION

The present invention provides a process for the manufacture of carbon membranes from a homogeneous starting material, with which it is also possible to make membranes having a high porosity and large pores, which membranes therefore are suitable even for the separation of relatively large particles at high transport rates, and consist of a homogeneous material, and the pore sizes of which can be controlled selectively by process parameters. The inventive process is characterized in that, before the first heat treatment, an acrylonitrile polymer membrane is pretreated in an aqueous hydrazine solution which contains at least 40 weight percent of hydrazine, and is then washed and dried.

DETAILED DESCRIPTION OF PREFERRED EMBODIMENTS OF THE INVENTION

It was found that the pores of the starting material do not change uncontrollably when the process of the invention is being carried out, but that the pore structure is essentially retained and can be controlled selectively by adjusting the various process parameters. It was further found that these steps can completely or almost completely prevent tar formation and clogging of the pores. A surprising finding was that the disadvantages of prior art processes can be overcome by pretreatment with a hydrazine solution of relatively high concentration.

The process according to the invention can produce membranes which have through-going, interconnected pores. This means that there are pores on both surfaces of these membranes and therewithin that are in communication with each other, and so that mass transport is possible from one surface of the membrane via the pore system to the other surface. In this way, constituents of a substance mixture which is present on one membrane surface can be separated from the mixture and recovered on the other surface of the membrane. In addition to through-going interconnected pores, there may be isolated pores or cavities inside the membrane that are not in communication with the surface and with the other pores. These pores, however, do not contribute to the mass transport.

With the process according to the invention it is possible to make membranes which comprise more than 75 weight percent of carbon. This high carbon content is obtained after carbonization at 600° to 3000° C., wherein the dwell times can be different, depending on the chosen temperature.

With the process according to the invention it is possible to make membranes in the form of capillary, tubular or flat membranes. Capillary membranes, which frequently are also referred to as hollow-filament or hollow-fiber membranes, are particularly well suited for many applications, since they have a high surface-to-volume ratio. Depending on the desired form of construction, the starting material for making membranes by the process of the invention is a porous membrane having the form of a capillary, tubular or flat membrane made from an acrylonitrile polymer. The starting membrane also has through-going pores.

With the process of the invention it is possible to make membranes with a porosity of 10 to 90%. Preferably, membranes with a porosity of 50 to 80% are made, since higher porosity in association with otherwise identical properties permits higher mass-transport rates, whereas with excessively high porosities the mechanical stability under some circumstances can no longer be fully satisfactory for many applications. In addition, with the process of the invention it is possible to make membranes with relatively small pores as well as with relatively large pores, depending on the choice of starting material with relatively small pores or with relatively large pores. For example, one can make carbon membranes with a maximum pore diameter between 0.005 and 3 microns. In a preferred embodiment, the maximum pore diameter varies between 0.01 and 0.05 microns. Such membranes are especially well suited for ultrafiltration.

In another preferred embodiment, porous membranes with a maximum pore diameter ranging from 0.1 to 1 micron are made by the process of the invention. These membranes can be used advantageously for microfiltration, i.e., for separating relatively large particles.

The porosity of the membranes is a measure of the volume occupied by the open, interconnected pores. It is defined as the ratio of this volume to the total volume of the membrane. The porosity can be determined by comparing the specific gravity of the membrane to the specific gravity of a nonporous carbon filament, which was made under the same conditions as the membrane, but using a nonporous starting material. In this case, the specific gravity of the membrane is determined by means of a nonwetting liquid.

The maximum pore diameter of the membranes can, for example, be determined by the known bubble-point method. This can be done by forming on one of the two membrane surfaces a continuous film of isopropanol at room temperature and under normal pressure, e.g., by placing one surface of a flat membrane in isopropanol or immersing a capillary membrane closed at the lower end in isopropanol. Thereafter, the other surface of the membrane is pressurized by gaseous nitrogen and the $N_2$ pressure raised until the first gas bubble appears at the surface pressurized with isopropanol. The pressure P at which this occurs is converted to the maximum pore diameter ($d_{max}$) by means of the following formula:

$$d_{max} = \frac{0.673}{P \text{ (bar)} - \text{normal pressure (bar)}}$$

This method determines the maximum value which a through-going pore possesses at its narrowest point.

The porosities and maximum pore diameters mentioned in this application relate only to the determination methods described above.

The process of the invention permits the manufacture of membranes, starting from porous membranes from organic material and converting the same by the above-described steps to membranes from organic material, and converting them by said techniques to membranes containing more than 75 weight percent carbon.

With the process of the invention, it is possible to make carbon membranes starting from acrylonitrile polymer membranes and having through-going, interconnected pores and a porosity of 10 to 90%. Their maximum pore diameter can be varied very widely, e.g., from 0.01 to 3 microns. In preferred embodiments of the process, membranes are made having a porosity of 50 to 80% and a maximum pore diameter ranging from 0.01 to 1.5 microns.

Membranes from a filament-forming acrylonitrile polymer are suitable as starting material for the manufacture of these membranes and can be converted by carbonization at a temperature of at least 600° C. to a formed carbon body consisting of more than 75 weight percent of carbon. Therefore, membranes from such acrylonitrile polymers that can be used for making carbon filaments or fibers are suitable.

The literature on carbon filaments cites numerous examples of such polymers. For example, reference is made to the book "Carbon Fibers" by J. B. Donnet and R. C. Bansal, "International Fiber Science and Technology Series", Vol. 3, Marcel Dekker, Inc., New York, 1984. Further information on this subject can be found in West German Accepted Specification (DE-AS) 2,614,391.

The starting porous membranes can be obtained by generally known processes for making membranes from organic polymers. One possibility for making a membrane with suitable pores is mentioned below in Example 1.

Other suitable processes for making suitable membranes from acrylonitrile polymers are described in West German Laid-open Application 1,954,505 and in U.S. Pat. No. 3,615,024.

With the process of the invention, membranes from acrylonitrile polymers are converted to carbon membranes. Acrylonitrile polymers are polymers which consist completely or up to at least 60, preferably 85 weight percent, of acrylonitrile units. Suitable acrylonitrile polymers are, for example, polyacrylonitrile or copolymers from acrylonitrile, and thus copolymerizable compounds with one or a plurality of olefinic double bonds, such as styrene, methacrylic acid and their esters, acrylic acid and their esters, vinyl ether and their esters, vinylsulfonic acid and vinyl chloride.

Since membranes from acrylonitrile polymers are used for making carbon membranes, a first heat treatment must be carried out before carbonization, i.e., conversion to the carbon membranes. From the literature on the manufacture of nonporous carbon filaments and fibers, it is known that this first heat treatment, often also referred to as preoxidation, is necessary in order to be able to carry out the subsequent carbonization with sufficient dimensional stability. The membranes from acrylonitrile polymers are rendered infusible by this first heat treatment.

With the process of the invention, the first heat treatment of preoxidation occurs in the temperature range of 180° to 350° C. The subsequent carbonization is conducted in the temperature range of 600° to 3000° C. In preferred embodiments, the first heat treatment occurs in the temperature range of 200° to 250° C. and the carbonization in the temperature range of 800° to 1600° C. It has been found that the properties of the resultant membranes and/or the costs of the process carried out within these prescribed ranges are more favorable than when operating outside of these ranges. The range of 200° to 250° C. for the first heat treatment is advantageous because the time requirement can increase significantly at temperatures below 200° C. and, depending on the polymer used, the mechanical properties of the membrane can be impaired at temperatures above 250° C.

A carbonization temperature below 800° C. can also increase the time requirement considerably, and a temperature above 1600° C. necessitates the use of special devices and noble gas, whereas operation in an $N_2$ atmosphere is possible up to 1600° C. On the other hand, at higher carbonization temperatures, e.g., above 2000° C., other properties such as electrical conductivity of the membranes can be improved because of increasing graphitization, so that the choice of carbonization temperature can depend, among other things, on the intended use.

The first heat treatment and the carbonization can be carried out at a constant temperature. It is also possible, however, to carry out one or both of these steps at a temperature which rises, e.g., in the process time characteristic or over the length of the apparatus. In this case, the maximum temperature lies within the aforesaid ranges.

The carbonization step is carried out in an inert gaseous medium, meaning that no oxidative or other chemical damage must occur to the membrane as a result of the medium.

Advantageously, nitrogen is used as the medium for this purpose. However, as known from the technical literature, the use of nitrogen at very high temperatures is ruled out because of the formation of nitrides. For applications at very high temperatures, e.g., between 2000° C. and 3000° C., noble gases, e.g., argon, are suitable as the medium for the carbonization.

Carbonization in connection with the manufacture of the membranes by the process according to the invention is a thermal conversion which produces carbon membranes and which takes place at a temperature of at least 600° C., but which can also be carried out at a temperature of, for example, 3000° C. If temperatures above approximately 2200° C. are applied, an increasing formation of graphite structures will take place with further increase of the carbon content of the membranes. Therefore, the term carbonization used in connection with the present invention also includes the conversion of the membranes using temperature ranges which are cited in the technical literature for the graphitization of carbon filaments.

Preferably, the first heat treatment mentioned above is carried out in air or in oxygen, during which membrane material is preoxidized.

The duration of the first heat treatment and of the carbonization can be varied within wide ranges. One must only assure that, as a result of the first heat treatment, the membrane has adequate dimensional stability, which is achieved by carrying out the first heat treatment over a period sufficient for rendering the membrane infusible. To do this, treatments lasting approximately 1 to 20 minutes are sufficient in normal cases, depending on the polymer and on the chosen temperature. Furthermore, the carbonization must be carried out over a period sufficient for producing a membrane that contains more than 75 weight percent of carbon. The necessary time depends on the polymer and on the temperature used, and generally lasts from 5 to 60 minutes.

In a preferred embodiment of the invention, membranes containing more than 85 weight percent of carbon are made with the process of the invention. For example, this can be achieved by choosing a suitable temperature and time of carbonization. Membranes containing more than 85 weight percent of carbon even have greater chemical stability than other carbon membranes. Moreover, because of the higher graphite content, which leads to increased electrical conductivity, they are suitable for applications in which good electrical conductivity is an advantage.

The first heat treatment and the carbonization can be carried out in devices which are known from the technical literature as suitable for the manufacture of carbon filaments, e.g., in electrically heated furnaces. Moreover, they can be carried out continuously or discontinuously, i.e., batchwise. Carrying out the process of the invention continuously is more cost-effective than in normal cases and may include as a component in a continuous process the step of pretreatment with an aqueous solution described below.

The first heat treatment or preoxidation and the carbonization can be carried out under conditions and in devices as taught by West German Accepted Specification 2,614,391 for the manufacture of carbon filaments. Further information on suitable conditions can be found in the above-mentioned book "Carbon Fibers", 1st edition, by J. B. Donnet and R. C. Bansal, 1984, Marcel Dekker, Inc., New York.

The first heat treatment and the carbonization can be carried out both continuously and batchwise, e.g., by passing a capillary membrane or a web of flat membrane from polyacrylonitrile continuously through series-connected furnaces in which the heat treatments are carried out. Therefore, the process is carried out appropriately by using furnaces each provided with an inlet and outlet opening for gases, whereby a fresh gaseous medium, which has been preheated, is fed continuously and, at the outlet, gases are removed continuously by a suitable exhausting device.

By selectively choosing starting membranes with particular properties, the properties of the carbon membranes to be obtained therefrom can be predetermined in the desired manner. Since, during conversion of the starting membranes from polyacrylonitrile or copolymerizate into carbon membranes, there is a reduction in the thickness of the membrane caused by weight loss, and frequently the pore size also diminishes somewhat, it is advisable to use starting members which are thicker and have a larger maximum pore diameter than are desired for the carbon membranes to be made therefrom. The extent to which thickness and pore sizes are reduced depends on the process conditions, such as temperature and time of heat treatment or carbonization, and can in every case be easily determined by a few experiments.

Preferably, membranes having a thickness between 5 and 200 microns are made by the process of the invention. Membranes with other thicknesses can also be made with the process of the invention, but if they are less than 5 microns thick, problems of mechanical stability may arise, particularly during pressure loading. With increasing thicknesses, on the other hand, the mass transfer rates become smaller, so that thicknesses of more than 200 microns can be unprofitable for certain fields of application.

The membranes that can be made by the process of the invention can have an isotropic or anisotropic pore system. In an anisotropic pore system, the pore size and/or structure has a gradient from the interior of the membrane to its surface. Particularly in the case of membranes with small-diameter pores, i.e., with a maximum pore diameter between 0.01 and 0.05 microns, an anisotropic pore system, in which the pore diameters at the membrane surface are smaller than inside the membrane, is frequently desired. These asymmetric membranes, which are particularly suitable for ultrafiltration, have a thin "surface skin" with a small pore size, which is responsible for the selectivity. If, on the other hand, the pores inside the membrane were also to be adjusted to the size preassigned by the selectivity requirements, this would be at the expense of the flow rates. The aforementioned method for determining the maximum pore diameters in the case of these anisotropic membranes indicates the maximum pore diameter of the through-going pores at their narrowest point.

In a preferred embodiment of the process of the invention, an unstretched or only partly stretched membrane is used as the starting material. In this case, only partial stretching means that the membranes from which the process is started are stretched after manufacture, which usually takes place by a spinning process, to no more than approximately 3 times their original length. In this respect, this preferred embodiment of the process of the invention differs from the manufacture of reinforcing carbon fibers in which, for reasons of strength and modulus properties required, highly stretched starting material is used in normal cases. The preferred use of unstretched or only partly stretched membranes for carrying out the process of the invention offers the advantage that the pore system of these membranes obtained after the spinning process is preserved to a larger extent in the carbon membranes than in the case of high stretching performed as an intermediate step. This also ensures greater dimensional stability. However, a reduction in the maximum pore diameter may occur, which, for example, can amount to 50% during the conversion into carbon membranes. The extent of which pore diameters decrease depends on process parameters such as time and temperature of carbonization, and can therefore be controlled by appropriate techniques. In this way and by choosing as starting material membranes with particular properties, for example, maximum pore diameters, pore sizes and structures of the membranes made with the process of the invention, can be adjusted selectively and with reproducibility.

Another technique in a preferred embodiment of the invention comprises carrying out the first heat treatment and/or carbonization with total or extensive shrinkage prevention. Shrinkage prevention in this case means that by using suitable techniques one prevents the membrane from shrinking more than 5% of its length or, in the case of flat membranes, of its length and width. In batch operation, the shrinkage prevention can, for example, be achieved by fixing the flat membrane into a frame or clamping the ends of a capillary or tubular membrane. If necessary, a slight tension is applied. In continuous processing, it is advisable to prevent shrinkage by passing a capillary, tubular, or flat membrane under tension through furnaces. The membrane can also be prevented from shrinking at all, that is to say, it retains its full length. If necessary, by applying an appropriately high tension, the length of the membrane can even be increased during the heat treatment, care being taken, of course, that the mechanical properties are not deleteriously affected.

In a number of cases, great dimensional stability of the membrane can be achieved by the shrinkage-preventing technique.

A determining factor for the process of the invention is that the membrane from acrylonitrile polymer, prior to the first treatment, be subjected to a pretreatment with an aqueous solution of hydrazine. It has been found that this improves the dimensional stability of the membrane during the subsequent process steps and, in particular, that tar formation and clogging of the pores can be prevented during these steps.

In this case, the aqueous solution contains at least 40, preferably 50 to 65, weight percent of hydrazine. The pretreatment is preferably carried out for 15 to 60 minutes, the solution preferably being kept at a temperature between 60° and 90° C. Very good results have been obtained for acrylonitrile polymers with a pretreatment with 80% hydrazine hydrate and a pretreatment time of 30 minutes at a solution temperature of 90° C. If the concentration is less than said minimum of 40 weight percent of hydrazine, the problem of tar formation during membrane manufacture cannot be solved satisfactorily. During the pretreatment, the membrane is fully immersed in the appropriate solution. The pretreatment by means of the aqueous solution can be carried out batchwise, but also as a step in a continuous process, e.g., by passing the membrane successively through a pretreatment bath, a washing bath and a drier, before feeding it to the first heat treatment, which follows without interruption.

After the pretreatment with solution, the membrane is washed and dried before it is fed to the first heat treatment. Preferably, washing is effected with water and drying, for example, in a circulating-air oven.

In certain cases, it has also proved advantageous to evacuate the pores of the membrane by applying a low air pressure and then filling them with nitrogen gas at normal pressure prior to said pretreatment with aqueous solution. In this way, one can obtain membranes with higher carbon content than if the pores were still filled with air during the pretreatment with aqueous hydrazine hydrate.

With the process of the invention one can obtain membranes of high strength, which is, for example, determined by the bursting pressure. To determine the bursting pressure, water is passed through the interior of the capillary or tubular membrane. Then, the pressure of the water is raised to room temperature in the interior of the membrane and the value at which a sudden pressure drop occurs is measured. This can be attributed to the bursting of the membrane.

Similarly, in the case of flat membranes, the measurement is effected on membranes fitted into a frame. The membranes made with the process of the invention usually have a bursting pressure of more than 12 bar. The bursting pressure is naturally dependent on the thickness of the membrane.

With the process of the invention one can make membranes with good dimensional stability, flexibility and electrical conductivity. The membranes are chemically stable in nonoxidizing media at temperatures above 1000° C., and can thus be used for high-temperatures processes.

Because of the chemical and thermal resistance, the membranes which can be made with the novel process are eminently suitable for microfiltration or ultrafiltration at elevated temperatures of chemically aggressive and/or hot media such as, for example, strong acids or bases. In addition, because of their chemical nature, the membranes have good resistance to organic liquids even at high temperature, so that they are more suitable for handling such liquids than are, for example, membranes of polyolefins, polyurethanes and polyamides. Advantageously, membranes having small pore sizes and made according to the invention can be used for the separation of solids from gases. A special application comprises the use of the membrane as support for a catalyst which serves for the cleaning of auto exhaust gases. In addition, such membranes can also be used advantageously for the separation, recovery or cleaning of gases which are produced in the chemical industry or in the power-plant sector.

The process of the invention is also applicable to the purification of waste waters from dyeworks.

Another advantage of the membranes which can be made with the novel process over membranes from noncarbonized organic polymers is the fact that immediately after fabrication they are sterile without further provisions and can be resterilized at any time by heat treatment.

The membranes which can be made by the novel process have the advantage over membranes from non-carbonized organic materials in that they have an excellent dimensional stability, i.e., they do not swell or shrink or do so to only a minor extent, even if they come into contact with organic solvents or vapors at high temperatures.

The invention will now be illustrated by a practical example, which is not to be interpreted as a limitation on the invention described and claimed herein.

EXAMPLE

Manufacture of a Porous Capillary Membrane from Polyacrylonitrile 17.5 g of polyacrylonitrile (number-average molecular weight: 50,000) and 7.5 g of polyethylene glycol (number-average molecular weight: 1,500) as pore producer were dissolved in 75.0 g of N,N-dimethylacetamide (DMAc). The resultant solution was filtered, carefully degassed, then spun through a hollow-filament spinneret at 25° C. to form the inside lumen, an aqueous DMAc solution containing 72 weight percent of DMAc was used. The temperature of this solution was 10° C. The hollow-filament spinneret was mounted 1 cm above an aqueous DMAc solution, serving as spinning bath, containing 70 weight percent of DMAc and having a temperature of 70° C. The dwell time of the membrane in the spinning bath was about 10 seconds. After passage through the spinning bath, the capillary membrane was wound at 10 m/min. The membrane was then stretched 100% in a steam atmosphere (1 bar gauge pressure) at a temperature of 120° C. To reduce the shrinkage, the membrane was treated with water at 90° C. for 5 seconds.

After drying, the resultant capillary membrane had the following properties:

| | |
|---|---|
| maximum pore diameter ($d_{max}$): | 0.41 micron |
| lumen diameter | 900 micron |
| wall thickness | 140 micron |
| weight percent of carbon | 69.1 |
| transmembrane flow (TMF) for isopropanol at 25° C. | 3.2 ml/cm$^2$ · min · bar |

Pretreatment and first heat treatment (preoxidation)

The capillary membrane was pretreated for 20 minutes at 70° C. in an aqueous solution containing 80 weight percent of hydrazine hydrate. This pretreatment was carried out in a nitrogen atmosphere with application of a slight tension to the membrane, so that it practically did not shrink. After washing with water and drying, the membrane was heat-treated in air for 20 minutes at 240° C. In this case as well, the operation was carried out practically without any shrinkage by clamping the ends of the membrane.

A dark-brown, flexible capillary membrane with the following properties was obtained:

| | |
|---|---|
| $d_{50}$ | 0.16 micron |
| $d_{max}$ | 0.32 micron |
| lumen diameter | 900 micron |
| wall thickness | 150 micron |
| weight percent of carbon | 66.4 |
| TMF (isopropanol, 25° C. | 2.8 ml/cm$^2$ · min · bar |

Carbonization

The membrane treated in the manner described above was heated at a constant rate from room temperature to 1200° C. within 1 hour in an externally heated ceramic tube and held at 1200° C. for 10 minutes. Nitrogen, which was passed through the furnace and was preheated prior to entry thereinto, was used as the inert medium. The carbonization was carried out while keeping the membrane length constant.

A metallically lustrous, black flexible capillary membrane with the following properties was obtained:

| | |
|---|---|
| lumen diameter | 700 micron |
| wall thickness | 120 micron |
| $d_{50}$ | 0.15 micron |
| $d_{max}$ | 0.30 micron |
| weight percent of carbon | 86.9 |
| electrical resistance | 100 ohm/cm (measured in longitudinal direction) |
| TMF (isopropanol, 25° C. | 2.4 ml/cm$^2$ · min · bar |

The parameter $d_{50}$ is defined as follows: 50% of the pores have a diameter which is larger than $d_{50}$, and 50% of the pores have a diameter smaller than $d_{50}$. $d_{50}$ is measured in accordance with ASTM 316, in which it is described how pore-size distributions can be determined by the bubble-point method. This method was modified in the present case by determining, as a function of pressure, not the flow data of a gas but those of a liquid.

By comparing the values of $d_{50}$ with those of $d_{max}$, the narrow pore-size distribution of the membranes is apparent.

In the Table below, properties of the membrane obtained according to the practical example are compared with the corresponding data of a membrane as taught by U.S. Pat. No. 3,977,967.

TABLE

|  | C membrane U.S. Pat. No. 3,977,967 | C membrane according to the invention |
|---|---|---|
| $d_{max}$ (micron) | 0.2–0.4 | 0.3 |
| $N_2$ flow ml/min · cm² · bar |  |  |
| $H_2O$ flow ml/m² · hr · bar | 150 | 3800 |

Despite comparable maximum pore sizes, the flow data of the membranes differ considerably.

We claim:

1. A process for making porous carbon membranes having a porosity of from 10 to 90% and having maximum pore diameter of from 0.005 to 3 microns in the form of capillary, tubular, or flat membranes and comprising more than 75 weight percent of carbon, comprising:

pretreating a porous membrane from an acrylonitrile polymer in an aqueous hydrazine solution containing at least 40 weight percent of hydrazine,
    washing and drying said membrane,
    heat treating said membrane in a temperature range of 180° to 350° C., and
    carbonizing said membrane in a temperature range of 600° to 3000° C., whereby clogging of the pores in said membrane is prevented.

2. The process as set forth in claim 1, wherein said aqueous solution contains 50 to 65 weight percent of hydrazine.

3. The process as set forth in claim 1, wherein the pretreatment lasts 15 to 60 minutes in a temperature range of 60° to 90° C.

4. The process as set forth in claim 1, further comprising evacuating the pores of the membrane by reduction of pressure and refilling said pores with nitrogen gas at normal pressure prior to the pretreatment.

5. The process as set forth in claim 1, wherein said membrane from an acrylic polymer is unstretched or only partly stretched.

6. The process as set forth in claim 1, wherein at least one of the heat treatment and the carbonization is carried out with complete or extensive shrinkage prevention.

7. The process as set forth in claim 1, wherein the carbonization is carried out in a nitrogen or noble gas atmosphere.

8. The process as set forth in claim 1, wherein the heat treatment is carried out in an air or oxygen atmosphere.

9. The process as set forth in claim 1, wherein the heat treatment is carried out in a temperature range of 200° to 250° C.

10. The process as set forth in claim 1, wherein the carbonization is carried out in a temperature range of 800° to 1600° C.

11. The process as set forth in claim 1, wherein the carbon membrane produced has a porosity of 50 to 80% and a maximum pore diameter in the range of 0.01 to 1.5 microns.

* * * * *

UNITED STATES PATENT AND TRADEMARK OFFICE
CERTIFICATE OF CORRECTION

PATENT NO. : 4,919,860
DATED : April 24, 1990
INVENTOR(S) : Erich SCHINDLER; Franz MAIER It is certified that error appears in the above-identified patent and that said Letters Patent is hereby corrected as shown below:

Cover Page, right column, in the ABSTRACT, Line 2, after "can", insert --be--.

Column 10, line 65, change "C." to --C.)--.

Column 11, line 21, after "ml/min·cm$^2$·bar" insert
-- 20      600--.

Signed and Sealed this

Thirteenth Day of August, 1991

Attest:

HARRY F. MANBECK, JR.

Attesting Officer

Commissioner of Patents and Trademarks